United States Patent
Sheng et al.

(10) Patent No.: US 11,308,242 B2
(45) Date of Patent: Apr. 19, 2022

(54) METHOD FOR PROTECTING ENCRYPTED CONTROL WORD, HARDWARE SECURITY MODULE, MAIN CHIP AND TERMINAL

(71) Applicants: ACADEMY OF BROADCASTING SCIENCE, NRTA, Xicheng District Beijing (CN); BEIJING NOVEL-SUPER DIGITAL TV TECHNOLOGY CO., LTD, Haidian District Beijing (CN); SUMAVISION TECHNOLOGIES CO., LTD, Haidian District Beijing (CN); HISILICON TECHNOLOGIES CO., LTD., Guangdong (CN)

(72) Inventors: Zhifan Sheng, Beijing (CN); Wei Xie, Beijing (CN); Jing Zhang, Beijing (CN); Xuebing Tian, Beijing (CN); Bin Xiong, Beijing (CN); Lizheng Zheng, Beijing (CN); Haifeng Yan, Guangdong (CN); Zhonghua Fang, Guangdong (CN); Qiang Wang, Beijing (CN); Qing Yang, Beijing (CN); Peng Chen, Beijing (CN); Longhui Jin, Beijing (CN); Jinglei Liu, Beijing (CN)

(73) Assignees: ACADEMY OF BROADCASTING SCIENCE, NRTA, XIcheng (CN); BEIJING NOVEL-SUPER DIGITAL TV TECHNOLOGY CO., LTD., Haidian (CN); SUMAVISION TECHNOLOGIES CO., LTD, Haidian (CN); HISILICON TECHNOLOGIES CO., LTD., Longgang ( * ) Notice: Subject to any disclaimer, the term of this patent is extended or adjusted under 35 U.S.C. 154(b) by 397 days.

(21) Appl. No.: 16/489,592

(22) PCT Filed: Feb. 9, 2018

(86) PCT No.: PCT/CN2018/075999
§ 371 (c)(1),
(2) Date: Aug. 28, 2019

(87) PCT Pub. No.: WO2018/157724
PCT Pub. Date: Sep. 7, 2018

(65) Prior Publication Data
US 2021/0232708 A1    Jul. 29, 2021

(30) Foreign Application Priority Data
Feb. 28, 2017    (CN) .......................... 201710116619.2

(51) Int. Cl.
*G06F 21/72*        (2013.01)
*H04L 9/08*         (2006.01)
(Continued)

(52) U.S. Cl.
CPC ............ *G06F 21/72* (2013.01); *H04L 9/0891* (2013.01); *H04L 9/0897* (2013.01);
(Continued)

(58) Field of Classification Search
CPC ..... G06F 21/72; H04L 9/0891; H04L 9/0897; H04N 21/26606; H04N 21/26613; H04N 21/42623; H04N 21/4623
See application file for complete search history.

(56) References Cited

U.S. PATENT DOCUMENTS 6,286,103 B1 * 9/2001 Maillard ............. H04L 63/0428
348/E7.056
9,479,825 B2   10/2016 Wang
(Continued)

FOREIGN PATENT DOCUMENTS

| CN | 101437145 A | 5/2009 |
| CN | 101924907 A | 12/2010 |

(Continued)

OTHER PUBLICATIONS

PCT Application No. PCT/CN2018/075999, International Search Report, dated Apr. 27, 2018, 4 pages.

*Primary Examiner* — Hee K Song
(74) *Attorney, Agent, or Firm* — Meunier Carlin & Curfman LLC

(57) ABSTRACT

Provided is a method for protecting an encrypted control word. The method includes: receiving a hardware security module entitlement management message and an encrypted control word transmitted from a main chip, where the hardware security module entitlement management message includes a key for decrypting the encrypted control word; decrypting, based on the hardware security module entitlement management message and a hardware security module root key stored in the hardware security module, the encrypted control word to obtain a control word; reencrypting the control word based on a re-encryption key stored in the hardware security module to obtain a reencrypted control word; and transmitting the reencrypted control word to the main chip, so that the main chip decrypts, based on a main chip entitlement management message transmitted from the front end, the reencrypted control word to obtain the control word.

15 Claims, 6 Drawing Sheets

(51) Int. Cl.
H04N 21/266 (2011.01)
H04N 21/426 (2011.01)
H04N 21/4623 (2011.01)

(52) U.S. Cl.
CPC . *H04N 21/26606* (2013.01); *H04N 21/26613* (2013.01); *H04N 21/42623* (2013.01); *H04N 21/4623* (2013.01)

(56) References Cited

U.S. PATENT DOCUMENTS

| 9,722,974 B1* | 8/2017 | Fuller | H04L 63/061 |
| 2011/0091037 A1* | 4/2011 | Pinder | H04L 9/0897 |
| | | | 380/255 |
| 2011/0099364 A1* | 4/2011 | Robyr | H04N 21/4623 |
| | | | 713/150 |

FOREIGN PATENT DOCUMENTS

| CN | 102082971 A | 6/2011 |
| CN | 102164320 A | 8/2011 |
| CN | 106803980 A | 6/2017 |
| WO | 2008157522 A1 | 12/2008 |

\* cited by examiner

METHOD FOR PROTECTING ENCRYPTED CONTROL WORD, HARDWARE SECURITY MODULE, MAIN CHIP AND TERMINAL

CROSS-REFERENCE TO RELATED APPLICATIONS

This application is a U.S. national phase application of international patent application No. PCT/CN2018/075999 filed on Feb. 9, 2018, which claims priority to Chinese patent application No. 201710116619.2, entitled "METHOD FOR PROTECTING ENCRYPTED CONTROL WORD, HARDWARE SECURITY MODULE, MAIN CHIP AND TERMINAL" and filed on Feb. 28, 2017, the disclosures of each of which are fully incorporated herein by reference in their entireties.

TECHNICAL FIELD

The present disclosure relates to message security technologies and, in particular, to a method for protecting an encrypted control word, a hardware security module, a main chip and a terminal.

BACKGROUND

The conditional access system (CAS) is a guarantee for the core technology of the encryption control of a digital television, provides the necessary technical means for the operation of the digital television, and enables authorized users to legally use a certain service while unauthorized users cannot use this service. Based on the CAS, binding the CAS and the set-top box together restricts the development of the industry. To solve this problem, a downloadable conditional access system based on hardware and software separation has emerged.

The DCAS is a complete end-to-end stream protection system, and is composed of a front end, a terminal and a security data management platform. The front end scrambles the input audio and video streams, and transmits authorized messages such as an encrypted control word to the terminal through a broadcast channel or bidirectional channel, where the control word is used for scrambling the audio and video streams, thereby completing the stream protection and the authorization control management of the stream playback.

Usually, in the traditional CAS, a smart card is a hardware security core of conditional access (CA) operations at the set-top box, and is used for storing authorization keys and participating in the generation of the control word. Data storage and logic determination in the smart card are regarded as reliable messages, and provide descrambling control words to other components of the set-top box. Compared with the CAS having the smart card, the DCAS does not have an isolated secure execution environment and a security storage like the smart card, therefore, how to ensure the security of the DCAS and to enable the terminal to safely acquire the authorization from the front end and descramble the audio and video streams have become an urgent problem to be solved.

SUMMARY

Embodiments of the present disclosure provides a method for protecting an encrypted control word, a hardware security module, a main chip and a terminal for ensuring the security of the DCAS, and enabling the terminal to safely acquire entitlement from the front end and descramble the audio and video streams.

A method for protecting an encrypted control word includes:
receiving a hardware security module entitlement management message and an encrypted control word transmitted from the main chip, where the hardware security module entitlement management message includes a key for decrypting the encrypted control word;
decrypting, based on the hardware security module entitlement management message and a hardware security module root key stored in the hardware security module, the encrypted control word to obtain a control word;
reencrypting the control word based on a re-encryption key stored in the hardware security module to obtain a reencrypted control word;
transmitting the reencrypted control word to the main chip, so that the main chip decrypts, based on a main chip entitlement management message transmitted from the front end, the reencrypted control word to obtain the control word, where the main chip entitlement management message includes a key for decrypting the reencrypted control word.

A method for protecting an encrypted control word includes:
receiving an encrypted control word, a scrambled content, a main chip entitlement management message and a hardware security module entitlement management message transmitted from the front end;
transmitting the hardware security module entitlement management message and the encrypted control word to the hardware security module, so that the hardware security module decrypts, based on the hardware security module entitlement management message and a hardware security module root key stored in the hardware security module, the encrypted control word to obtain a control word, and reencrypts the control word based on a re-encryption key stored in the hardware security module to obtain a reencrypted control word; and
receiving the reencrypted control word transmitted from the hardware security module, decrypting, based on a main chip root key derived by the main chip and the main chip entitlement management message, the reencrypted control word to obtain the control word so that the scrambled content is descramble based on the control word.

A hardware security module, applied to a downloadable conditional access system, includes:
a first reception unit configured to receive a hardware security module entitlement management message and an encrypted control word transmitted from the main chip, where the hardware security module entitlement management message includes a key for decrypting the encrypted control word;
a security storage area configured to store a hardware security module root key, a re-encryption key and the hardware security module entitlement management message;
a first decryption engine configured to decrypt, based on the hardware security module entitlement management message and the hardware security module root key, the encrypted control word to obtain a control word;
a reencryption engine configured to reencrypt the control word based on the re-encryption key to obtain a reencrypted control word;
a first transmission unit configured to transmit the reencrypted control word to the main chip, so that the main chip decrypts, based on a main chip entitlement management message transmitted from the front end, the reencrypted control word to obtain the control word, where the main chip entitlement management message includes a key for decrypting the reencrypted control word.

A main chip, applied to a downloadable conditional access system, includes:

a third reception unit configured to receive an encrypted control word, a scrambled content, a main chip entitlement management message and a hardware security module entitlement management message transmitted from the front end;

a second transmission unit configured to transmit the hardware security module entitlement management message and the encrypted control word to the hardware security module, so that the hardware security module decrypts, based on the hardware security module entitlement management message and the hardware security module root key stored in the hardware security module, the encrypted control word to obtain a control word, and reencrypts the control word based on a re-encryption key stored in the hardware security module to obtain a reencrypted control word; and a fourth reception unit configured to receive the reencrypted control word transmitted from the hardware security module; and a second decryption engine for decrypting, based on a main chip root key derived by the main chip and the main chip entitlement management message, the reencrypted control word to obtain the control word so that the scrambled content is descrambled based on the control word.

A terminal, applied to a downloadable conditional access system, includes the hardware security module and the main chip described above.

A computer-readable storage medium, which is configured to store computer-executable instructions for executing any method described above.

The method for protecting the encrypted control word of the present disclosure enables that important information about decryption cannot be intercepted from the hardware security module by the outside, so that the security of the DCAS is enhanced by the hardware security module.

DETAILED DESCRIPTION

Embodiment One

Figure 1:
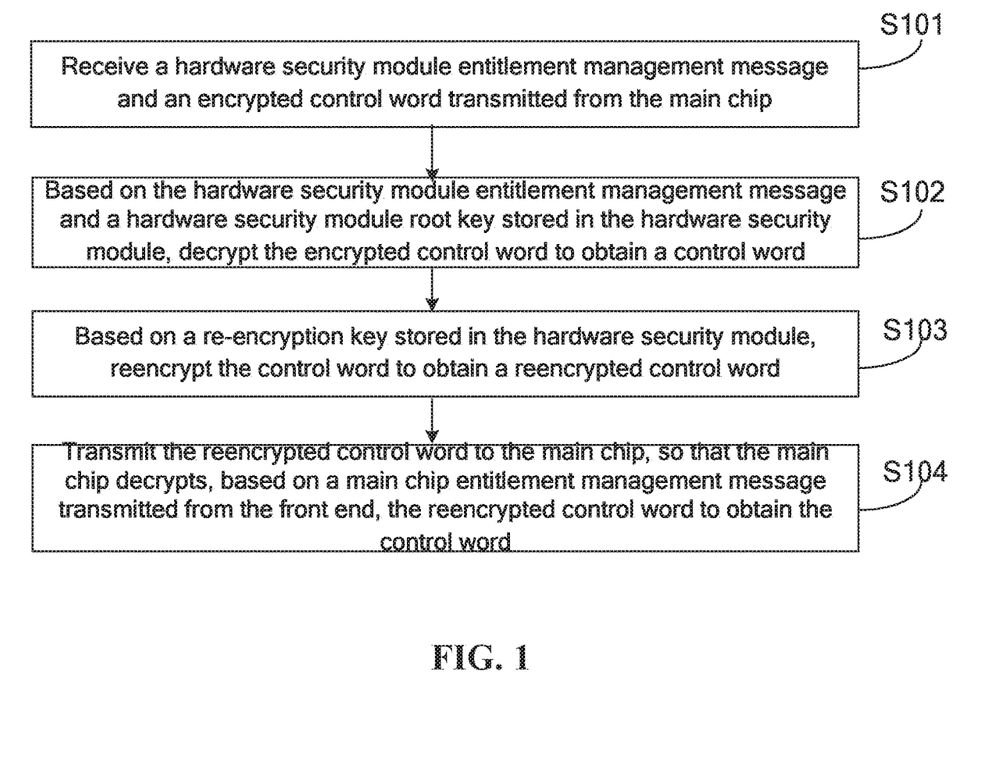
FIG. 1 is a flowchart illustrating a method for protecting an encrypted control word according to embodiment one of the present disclosure.

FIG. 1 is a flowchart illustrating a method for protecting an encrypted control word according to embodiment one of the present disclosure. This embodiment may be applied to a DCAS. The DCAS includes a front end and a terminal. The terminal includes a main chip and a hardware security module. The method may be executed by the hardware security module. The hardware security module (HSM) in this embodiment is a dedicated encryption processor for protecting the life cycle of an encrypted key. The hardware security module ensures the security of the encrypted key used in transaction, application program and sensitive data through safely managing, processing and storing the encrypted key in a reliable and tamper-proof device.

The method of embodiment one of the present disclosure includes steps 110 to 140 described below.

In step 110, a hardware security module entitlement management message and an encrypted control word transmitted from the main chip are received. The hardware security module entitlement management message includes a key for decrypting the encrypted control word.

The control word is used by the front end for scrambling the audio and video content subscribed by the user, for example, for the digital television content. The content that has been scrambled may be descrambled based on the control word so that the audio and video content may be watched. Therefore, the control word needs to be encrypted, and only the entitled user is allowed to decrypt the encrypted control word, thereby ensuring the normal operation of the system. The hardware security module entitlement management message includes a key for decrypting the encrypted control word.

In step 120, based on the hardware security module entitlement management message and a hardware security module root key stored in the hardware security module, the encrypted control word is decrypted to obtain the control word.

The hardware security module root key is a root key that is in a one-to-one correspondence with the hardware security module, that is, different hardware security modules have different root keys. The root key is stored in the hardware security module and may not be obtained by the outside, and the encrypted control word cannot be decrypted without the root key.

In an embodiment, the hardware security module entitlement management message includes a hardware security module second-level key and a hardware security module third-level key. Accordingly, based on the hardware security module entitlement management message and the hardware security module root key stored in the hardware security module, the encrypted control word is decrypted as follows to obtain the control word: decrypting, based on the hardware security module root key stored in the hardware security module, the hardware security module second-level key and the hardware security module third-level key, the encrypted control word level by level to obtain the control word.

In an embodiment, for a safety reason, the DCAS adopts hierarchical keys. That is, after the front end encrypts the control word according to the third-level key, then encrypts the third-level key according to the second-level key, then encrypts the second-level key according to the root key. For example, the front end encrypts the CW according to the third-level key K1 and obtains EK1 (CW), then encrypts K1 according to the second-level key K2 and obtains EK2 (K1), then encrypts K2 according to the hardware security module root key and obtains Ekroot (K2). EK1 (CW), EK2 (K1) and Ekroot (K2) together constitute the encrypted control word. The second-level key and the third-level key may be a random number generated by the front end.

The second-level key and the third-level key are transmitted in the forms of the hardware security module entitlement management message to the hardware security module from the main chip. The hardware security module decrypts, based on the stored hardware security module root key, the second-level key and the third-level key in the hardware security module entitlement management message, the encrypted control word to obtain the control word in the form of plaintext. In the above embodiment, the hardware security module performs decryption according to the stored RootKey and Ekroot (K2) in the encrypted control word to obtain K2, and performs decryption according to K2 and EK2 (K1) to obtain K1, and performs decryption according to K1 and EK1 (CW) to obtain the control word in the form of plaintext. The decryption algorithm may be configured according to the actual requirements, such as a AES (Advanced Encryption Standard) or a 3DES algorithm (a collective reference of a triple data encryption algorithm (TDEA) block code).

In step 130, based on a re-encryption key stored in the hardware security module, the control word is reencrypted, and a reencrypted control word is obtained.

For a safety reason, the control word in the form of plaintext is fed back to the main chip after being reencrypted. For example, the re-encryption key is CREEK, and Ecreek (CW) is obtained through the re-encryption.

In step 140, the reencrypted control word is transmitted to the main chip, so that the main chip decrypts, based on a main chip entitlement management message transmitted from the front end, the reencrypted control word to obtain the control word, where the main chip entitlement management message includes a key for decrypting the reencrypted control word.

Optionally, the main chip also needs a corresponding key to decrypt the reencrypted control word. The key is transmitted from the front end to the main chip in the form of the main chip entitlement management message so as to entitle the main chip to obtain the control word, thereby descrambling and broadcasting the scrambled content.

In an embodiment, the above hardware security module entitlement management message, the hardware security module root key, the re-encryption key may be updated to meet the security requirements. The updating frequency may be configured according to the actual usage scenarios. In practice, a key refreshing instruction may be transmitted from the main chip from the front end, and the hardware security module updates, based on the key refreshing instruction, original related keys and stores the updated keys.

In the embodiment of the present disclosure, an encrypted control word is decrypted by a hardware security module based on a hardware security module root key stored in the hardware security module and a received hardware security module entitlement management message to obtain a control word, and the control word is reencrypted based on a re-encryption key stored in the hardware security module to obtain a reencrypted control word, then the reencrypted control word is transmitted to a main chip so that the main chip decrypts the reencrypted control word based on a main chip entitlement management message transmitted from a front end to obtain the control word. Since important information regarding decryption cannot be intercepted from the hardware security module by the outside, the security of the DCAS is enhanced by using the hardware security module.

Moreover, as for a radio and television system such as a direct broadcasting satellite system, its traffic requirement for CA is a unidirectional DCAS without a smart card. Therefore, the security of the DCAS cannot be ensured by transferring data storage and entitlement logic to the front end through a bidirectional network. The embodiment of the present disclosure implements the entitlement logic through the hardware security module, and is more applicable to such unidirectional DCAS without a smart card, enhancing the security of the unidirectional DCAS without a smart card.

Embodiment Two

Figure 2:
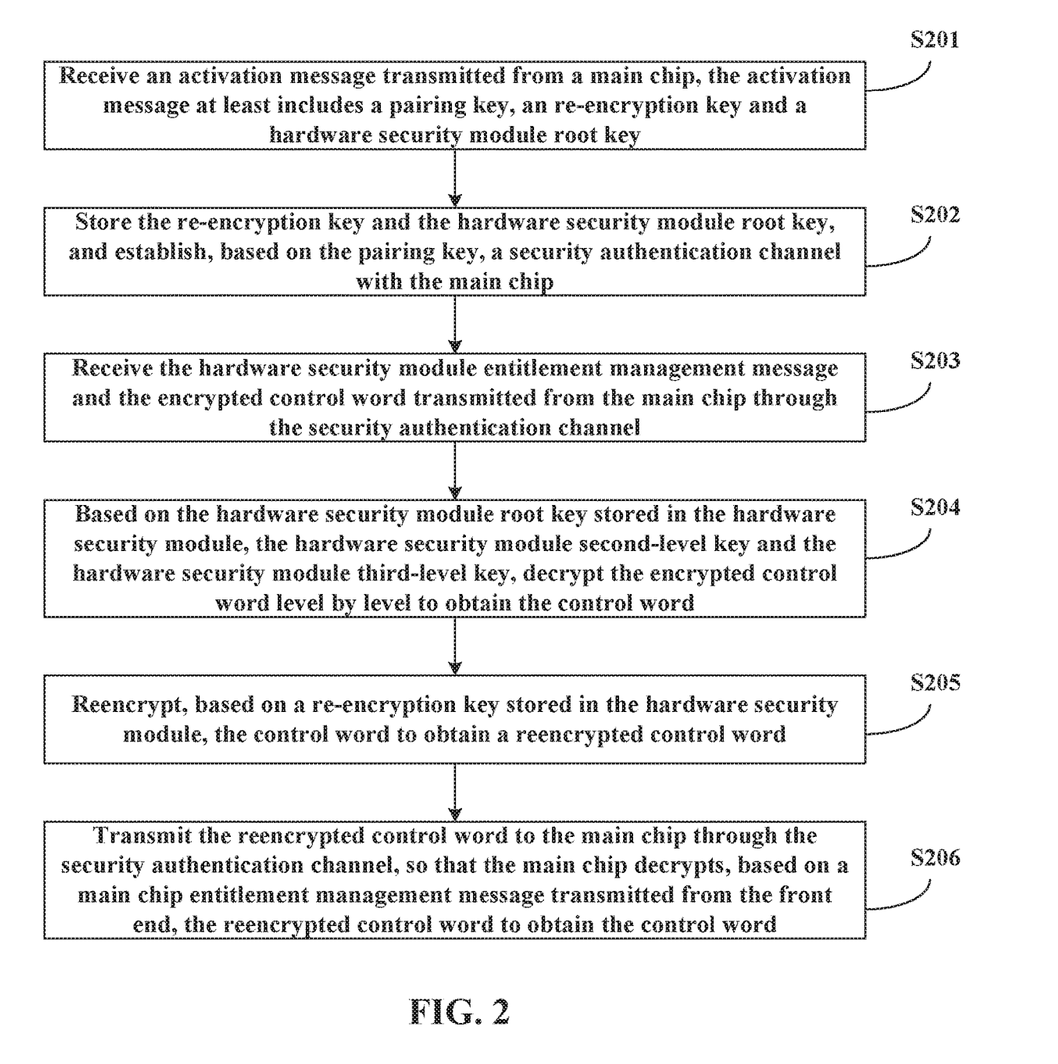
FIG. 2 is a flowchart illustrating a method for protecting an encrypted control word according to embodiment two of the present disclosure.

FIG. 2 is a flowchart illustrating a method according to embodiment two of the present disclosure. On the basis of embodiment one, embodiment two changes activation operations of the terminal. As shown in FIG. 2, the method of embodiment two of the present disclosure specifically includes steps 210 to 260 described below.

In step 210, an activation message transmitted from the main chip is received. The activation message at least includes a pairing key, a re-encryption key and a hardware security module root key.

The activation described here is usually performed before the terminal use, and after the activation, the terminal may be used normally. In the embodiment, an activation request message is transmitted to the front end from the main chip in the terminal. Next, the front end transmits an activation message to the main chip, and then the activation message is transmitted to the hardware security module by the main chip. The activation message at least includes the pairing key, the re-encryption key and the hardware security module root key.

In addition, the activation may be completed manually. For example, a technician acquires information about the terminal by scanning a two-dimensional code on the terminal, and the information is uploaded to the front end through a client software for implementing the transmission of the activation request message, then the activation message is received through the client software and manually transmitted to the main chip of the terminal.

In step 220, the re-encryption key and the hardware security module root key are stored, and a security authentication channel between the hardware security module and the main chip is established based on the pairing key.

After the re-encryption key and the hardware security module root key are stored, the decryption operation described in the above embodiment may be performed. In the present embodiment, a security storage area in the hardware security module may be used for storing the re-encryption key and the hardware security module root key.

Moreover, it is also necessary to establish the security authentication channel between the hardware security module and the main chip according to the pairing key after the activation is performed. During use, all data is transmitted between the hardware security module and the main chip through the security authentication channel, thereby enhancing the security of data.

In step 230, a hardware security module entitlement management message and an encrypted control word transmitted from the main chip are received through the security authentication channel.

In step 240, based on the hardware security module root key stored in the hardware security module, the hardware security module second-level key and the hardware security module third-level key, the encrypted control word is decrypted level by level to obtain the control word.

In step 250, based on the re-encryption key stored in the hardware security module, the control word is reencrypted to obtain a reencrypted control word.

In step 260, the reencrypted control word is transmitted to the main chip through the security authentication channel, so that the main chip decrypts, based on a main chip entitlement management message transmitted from the front end, the reencrypted control word to obtain the control word. The main chip entitlement management message includes a key for decrypting the reencrypted control word.

The embodiment of the present disclosure receives and stores the re-encryption key and the hardware security module root key through the activation message, and according to the pairing key in the activation message, the security authentication channel between the hardware security module and the main chip is established, thereby enhancing the security of data.

Embodiment Three

Figure 3:
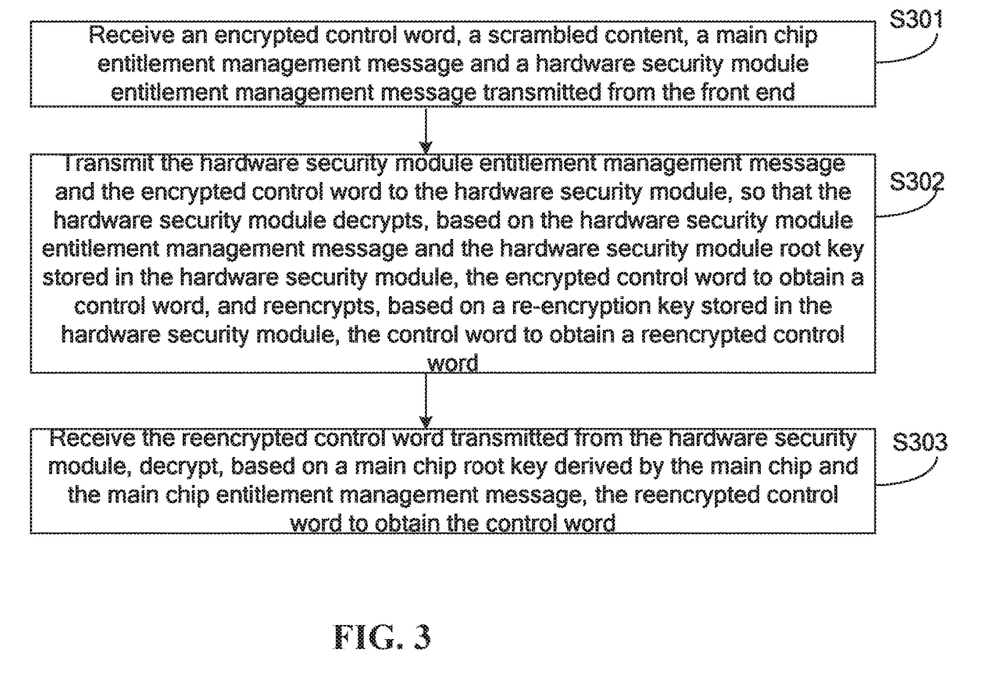
FIG. 3 is a flowchart illustrating a method for protecting an encrypted control word according to embodiment three of the present disclosure.

FIG. 3 is a flowchart illustrating a method for protecting an encrypted control word according to embodiment three of the present disclosure. This embodiment may be applied to a DCAS. The DCAS includes a front end and a terminal. The terminal includes a main chip and a hardware security module. The method may be executed by the main chip. The method of embodiment three of the present disclosure includes steps 310 to 330 described below.

In step 310, an encrypted control word, a scrambled content, a main chip entitlement management message and a hardware security module entitlement management message transmitted from the front end are received.

The control word is used for scrambling the audio and video content to be played by the front end. After the control word is encrypted, the terminal is entitled by transmitting the main chip entitlement management message and the hardware security module entitlement management message to the main chip. The main chip transmits the hardware security module entitlement management message to the hardware security module, so that the hardware security module decrypts the encrypted control word. The main chip may also decrypt the control word reencrypted by the hardware security module based on the main chip entitlement management message.

Here, the front end, for example, may transmit the above content to various terminals through a broadcast channel, and the terminal receives the above content according to its own requirements.

In step 320, the hardware security module entitlement management message and the encrypted control word are transmitted to the hardware security module, so that the hardware security module decrypts, based on the hardware security module entitlement management message and the hardware security module root key stored in the hardware security module, the encrypted control word to obtain a control word, and reencrypts the control word based on a re-encryption key stored in the hardware security module to obtain a reencrypted control word.

The operations related to the hardware security module have been described in embodiment one and embodiment two, which are not repeated herein.

In step 330, the reencrypted control word transmitted from the hardware security module is received, and the reencrypted control word is decrypted based on a main chip root key derived by the main chip and the main chip entitlement management message to obtain the control word, so that the scrambled content is descrambled according to the control word.

Optionally, the main chip root key corresponds to the main chip. In the present embodiment, the main chip root key is derived from the main chip security key and a derivative identifier according to a derivative algorithm built-in the main chip. The main chip security key may be stored in a one time programmable (OTP) area inside the main chip. The derivative identifier is related to a selected CA, and may be configured in a software executed by the terminal. When there is a decryption requirement, the derivative identifier is sent to the main chip in the form of an instruction. If the CA is changed, the derivative identifier may be changed by changing the software. Therefore, different main chips may derive different main chip root keys based on different CAs to meet the requirement of the flexibility.

In an embodiment, hierarchical keys may be adopted. The main chip entitlement management message includes a main chip second-level key and a main chip third-level key. Correspondingly, the reencrypted control word is decrypted based on the main chip root key derived by the main chip and the main chip entitlement management message as follows: decrypting, based on the main chip root key, the main chip second-level key and the main chip third-level key, the reencrypted control word level by level to obtain the control word. The main chip third-level key corresponds to the re-encryption key. For example, the main chip third-level key may be the same as the re-encryption key, then the front end encrypts the control word, encrypts the third-level key K1' according to the main chip second-level key K2' to obtain EK2 (K1), then encrypts the main chip second-level key K2' according to the main chip root key K3 to obtain EK3 (K2). EK3 (K2) and EK2 (K1) as the encrypted word are transmitted to the main chip, the main chip decrypts EK3 (K2) according to K3 to obtain K2', and decrypts EK2 (K1) according to K2' to obtain K1', and decrypts, based on K1', the reencrypted control word transmitted to the main chip from the hardware security module to obtain the control word in the form of plaintext, and finally descrambles and broadcasts the scrambled content.

The entitlement is implemented by the main chip and the hardware security module in the embodiment, thereby enhancing the security of the DCAS by using the hardware security module. The method is especially suitable for unidirectional DCAS without a smart card.

Embodiment Four

Figure 4:
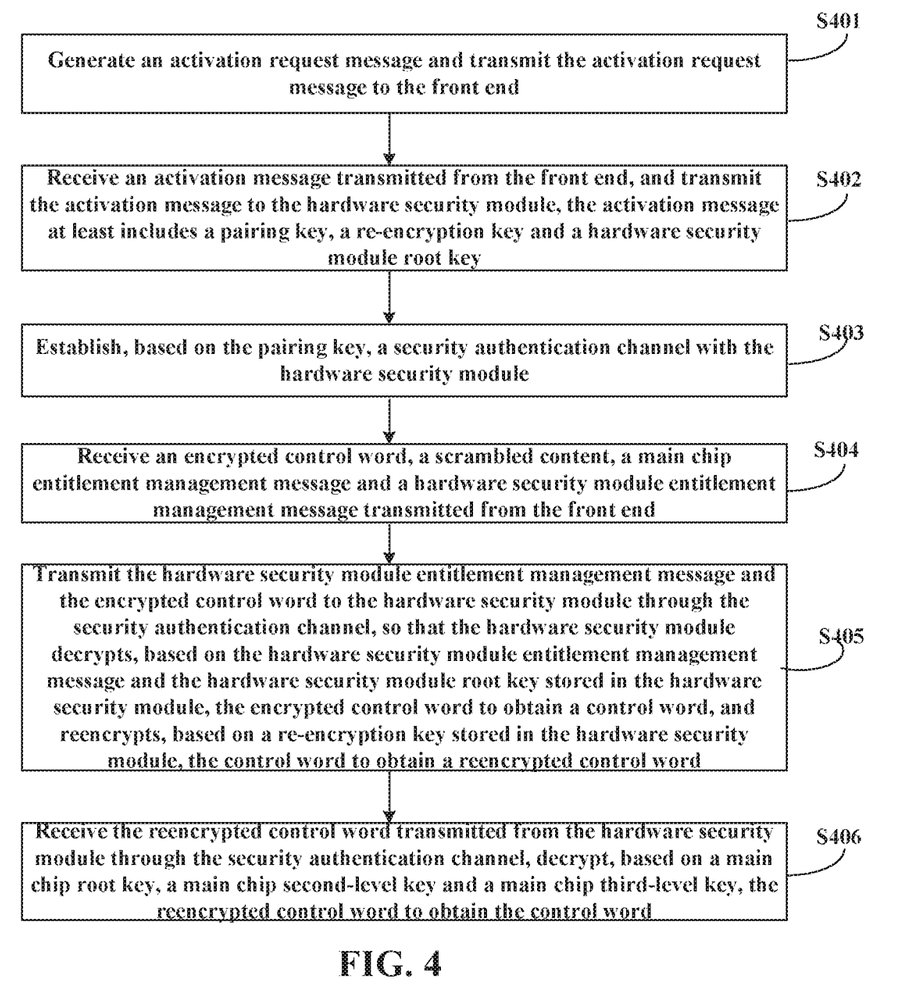
FIG. 4 is a flowchart illustrating a method for protecting an encrypted control word according to embodiment four of the present disclosure.

FIG. 4 is a flowchart illustrating a method for protecting an encrypted control word according to embodiment four of the present disclosure. Embodiment four is a further improvement on the basis of the above embodiments. As shown in FIG. 4, the method in embodiment four of the present disclosure includes steps 410 to 460 described below.

In step 410, an activation request message is generated and transmitted to the front end. The activation request message at least includes an identifier of the identifier of the main chip, a conditional access certificate and a chip certificate for the hardware security module.

In step 420, an activation message transmitted from the front end is received and transmitted to the hardware security module. The activation message at least includes a pairing key, a re-encryption key and a hardware security module root key. The pairing key, the re-encryption key and the hardware security module root key in the activation message are distributed by the front end based on the activation request message.

In the present embodiment, the pairing key, the re-encryption key and the hardware security module root key are distributed by the front end based on the information carried in the activation request message. After verifying the legality of the activation request message, based on the identifier of the main chip, the conditional access certificate and the chip certificate for the hardware security module and the like, the front end distributes a corresponding re-encryption key and the hardware security module root key for the hardware security module in the terminal, and distributes the corresponding pairing key through the security authentication channel between the main chip and the hardware security module in the terminal.

In step 430, the security authentication channel between the main chip and the hardware security module is established based on the pairing key.

In step 440, an encrypted control word, a scrambled content, a main chip entitlement management message and a hardware security module entitlement management message transmitted from the front end are received.

In step 450, the hardware security module entitlement management message and the encrypted control word are transmitted to the hardware security module through the security authentication channel, so that the hardware security module decrypts, based on the hardware security module entitlement management message and the hardware security module root key stored in the hardware security module, the encrypted control word to obtain a control word, and reencrypts the control word based on the re-encryption key stored in the hardware security module to obtain a reencrypted control word.

In step 460, the reencrypted control word transmitted from the hardware security module is received though the security authentication channel, and the reencrypted control word is decrypted according to a main chip root key derived from the main chip and the main chip entitlement management message to obtain the control word, so that the scrambled content is descrambled based on the control word.

In the present embodiment, the pairing key, the re-encryption key and the hardware security module root key are acquired through the activation operation, the security authentication channel between the main chip and the hardware security module is established based on the pairing key. After the activation operation, the main chip root key is derived based on the main chip security key and the derivative identifier, and is used for subsequent control word decryption operations, enhancing the security of the DCAS.

Embodiment Five

Figure 5:
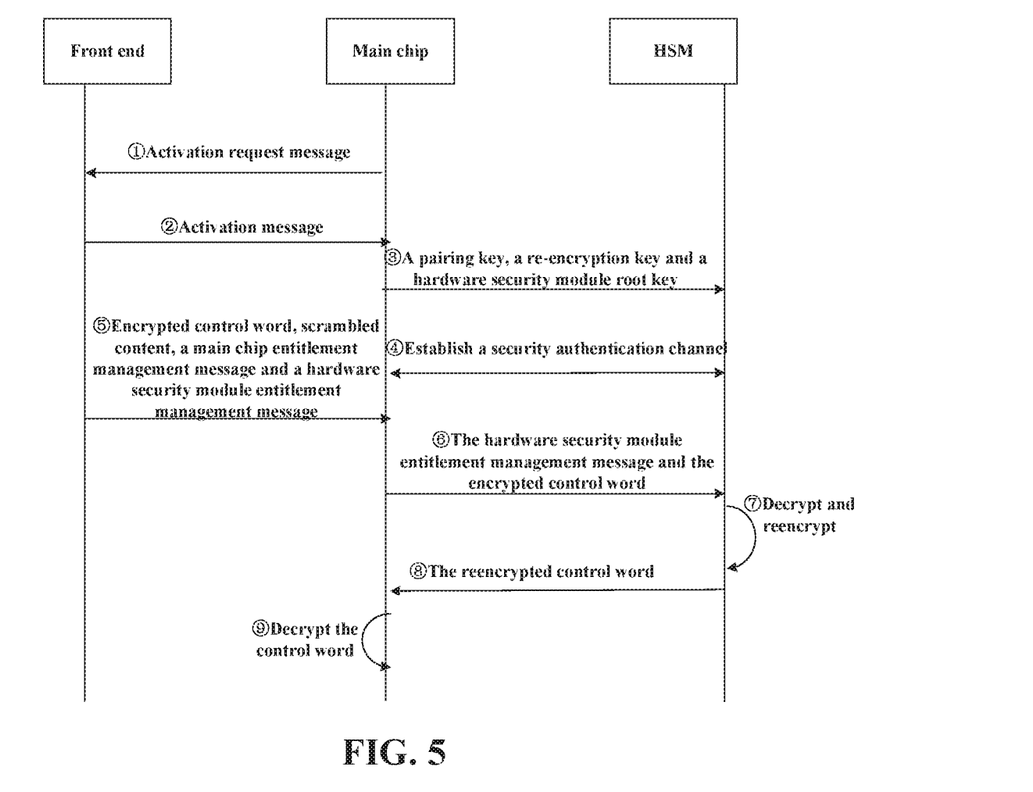
FIG. 5 is a flowchart illustrating a method for protecting an encrypted control word according to embodiment five of the present disclosure.

FIG. 5 is a flowchart illustrating a method for protecting an encrypted control word according to embodiment five of the present disclosure. Embodiment five is further described on the basis of the above embodiments. As shown in FIG. 5, the method in the present embodiment includes steps described below.

① An activation request message is generated by a main chip and transmitted to a front end, where the activation request message at least includes an identifier of the main chip, a conditional access certificate and a chip certificate for the hardware security module.

② An activation message is generated by the front end based on the activation request message, and transmitted to the main chip, where the activation message at least includes a pairing key, a re-encryption key and a hardware security module root key.

③ The pairing key, the re-encryption key and the hardware security module root key in the activation message are transmitted to the hardware security module by the main chip.

④ The hardware security module stores the re-encryption key and the hardware security module root key, and establishes a security authentication channel between the hardware security module and the main chip by using the pairing key.

⑤ An encrypted control word, a scrambled content, a main chip entitlement management message and a hardware security module entitlement management message are transmitted to the main chip from the front end;

⑥ The hardware security module entitlement management message and the encrypted control word are transmitted to the hardware security module from the main chip through the security authentication channel.

⑦ The encrypted control word is decrypted by the hardware security module based on the hardware security module entitlement management message and the hardware security module root key stored in the hardware security module and a control word is obtained, and the control word is reencrypted based on the re-encryption key stored in the hardware security module and a reencrypted control word is obtained.

⑧ The reencrypted control word is transmitted to the main chip from the hardware security module through the security authentication channel.

⑨ The main chip decrypts, based on a main chip root key derived by the main chip and the main chip entitlement management message, the reencrypted control word to obtain the control word, so that the scrambled content is descrambled based on the control word.

The present embodiment is applicable to a DCAS, especially to a unidirectional DCAS without a smart card, enhancing the security of the unidirectional DCAS without a smart card.

Embodiment Six

Figure 6:
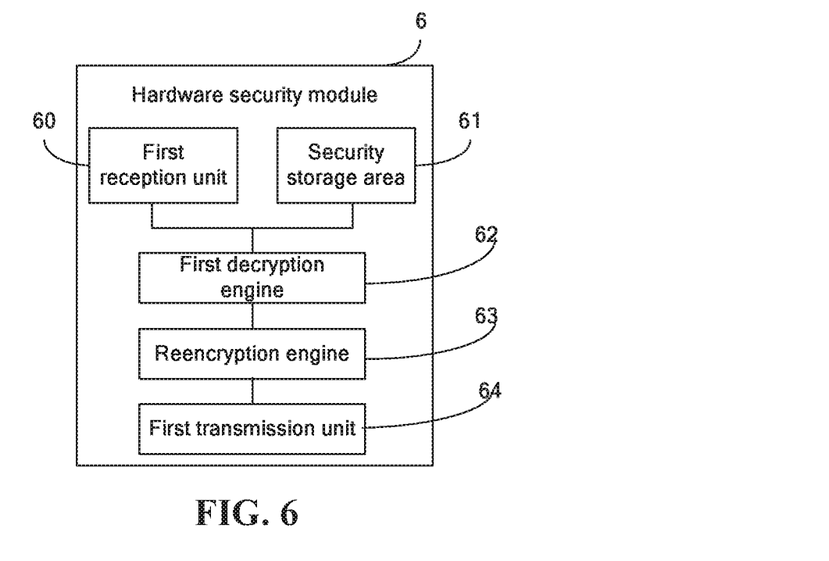
FIG. 6 is a structural diagram illustrating a hardware security module according to embodiment six of the present disclosure.

FIG. 6 is a structural diagram illustrating a hardware security module according to embodiment six of the present disclosure. The hardware security module is applied to a DCAS. The DCAS includes a front end and a terminal. The terminal includes a main chip and the hardware security module. As shown in FIG. 6, the hardware security module 6 includes:

a first reception unit 60 configured to receive a hardware security module entitlement management message and an encrypted control word transmitted from the main chip, where the hardware security module entitlement management message includes a key for decrypting the encrypted control word;

a security storage area 61 configured to store a hardware security module root key, a re-encryption key and the hardware security module entitlement management message;

a first decryption engine 62 configured to decrypt, based on the hardware security module entitlement management message and the hardware security module root key, the encrypted control word to so as obtain a control word;

a reencryption engine 63 configured to reencrypt the control word according to the re-encryption key and obtain a reencrypted control word; and a first transmission unit 64 configured to transmit the reencrypted control word to the main chip, so that the main chip decrypts, based on a main chip entitlement management message transmitted from the front end, the reencrypted control word and obtains the control word, where the main chip entitlement management message includes a key for decrypting the reencrypted control word.

In the present embodiment, the hardware security module 6 further includes:

a second reception unit (not shown in the figure) configured to receive an activation message transmitted from the main chip, where the activation message at least includes a pairing key, the re-encryption key and the hardware security module root key; and a first pairing unit (not shown in the figure) configured to establish a security authentication channel between the main chip and the hardware security module based on the pairing key.

In the present embodiment, the first reception unit 60 is configured to receive the hardware security module entitlement management message and the encrypted control word transmitted from the main chip in the following manner: receiving the hardware security module entitlement management message and the encrypted control word transmitted from the main chip through the security authentication channel.

The first transmission unit 64 is configured to transmit the reencrypted control word to the main chip through the security authentication channel.

In the present embodiment, the hardware security module entitlement management message includes a hardware security module second-level key and a hardware security module third-level key.

In the present embodiment, the first decryption engine 62 is configured to:

decrypt, based on the hardware security module root key stored in the hardware security module, the hardware security module second-level key and the hardware security module third-level key, the encrypted control word level by level to obtain the control word.

In the present embodiment, the hardware security module 6 further includes:

an updating unit (not shown in the figure) configured to receive a key refreshing instruction transmitted from the main chip, and update and store the hardware security module entitlement management message, the hardware security module root key and the re-encryption key.

In the present embodiment, the security storage area 61 is further configured to store an updated hardware security module entitlement management message, an updated hardware security module root key and an updated re-encryption key.

The hardware security module of the present embodiment is configured to: decrypt an encrypted control word based on a hardware security module root key stored in the hardware security module and a received hardware security module entitlement management message and obtains a control word; reencrypt the control word based on a re-encryption key stored in the hardware security module to obtain a reencrypted control word; transmit the reencrypted control word to a main chip, so that the main chip decrypts, based on a main chip entitlement management message transmitted from a front end, the reencrypted control word to obtain the control word. Since the outside fails to intercept important information about decryption from the hardware security module, the security of the DCAS is enhanced by the hardware security module. Moreover, the hardware security module is especially applicable to a unidirectional DCAS without a smart card, and provides security assurance for the unidirectional DCAS without a smart card.

Embodiment Seven

Figure 7:
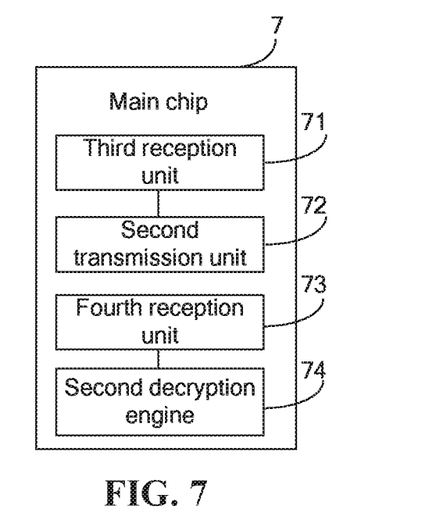
FIG. 7 is a structural diagram illustrating a main chip according to embodiment seven of the present disclosure.

FIG. 7 is a structural diagram illustrating a main chip according to embodiment seven of the present disclosure. The main chip is applied to a DCAS. The DCAS includes a front end and a terminal. The terminal includes the main chip and a hardware security module. As shown in FIG. 7, the main chip 7 includes:

a third reception unit 71 configured to receive an encrypted control word, a scrambled content, a main chip entitlement management message and a hardware security module entitlement management message transmitted from the front end;

a second transmission unit 72 configured to transmit the hardware security module entitlement management message and the encrypted control word to the hardware security module, so that the hardware security module decrypts, based on the hardware security module entitlement management message and a hardware security module root key stored in the hardware security module, the encrypted control word to obtain a control word, and reencrypts, based on a re-encryption key stored in the hardware security module, the control word to obtain a reencrypted control word; and a fourth reception unit 73 configured to receive the reencrypted control word transmitted from the hardware security module; and a second decryption engine 74 configured to decrypt, based on a main chip root key derived by the main chip and the main chip entitlement management message, the reencrypted control word to obtain the control word so as to descramble the scrambled content based on the control word.

In the present embodiment, the main chip 7 further includes:

an activation request message generation unit (not shown in the figure) configured to generate an activation request message and transmit the activation request message to the front end, where the activation request message at least includes an identifier of the main chip, a conditional access certificate and a chip certificate for the hardware security module;

an activation message reception unit (not shown in the figure) configured to receive an activation message transmitted from the front end, and transmit the activation message to the hardware security module, where the activation message at least includes a pairing key, the re-encryption key and the hardware security module root key, and the pairing key, the re-encryption key and the hardware security module root key in the activation message are distributed by the front end based on the activation request message; and a second pairing unit (not shown in the figure) configured to establish a security authentication channel between the main chip and the hardware security module based on the pairing key.

In the present embodiment, the second transmission unit 72 is configured to transmit the hardware security module entitlement management message and the encrypted control word to the hardware security module through the security authentication channel.

The fourth reception unit 73 is configured to receive the reencrypted control word transmitted from the hardware security module through the security authentication channel.

In the present embodiment, the main chip 7 further includes:

a root key derivation unit (not shown in the figure) configured to derive, based on a main chip security key and a derivation identifier, the main chip root key through a derivation algorithm built-in the main chip.

In the present embodiment, the main chip entitlement management message comprises a main chip second-level key and a main chip third-level key. Accordingly, the second decryption engine 74 is configured to:

decrypt, based on the main chip root key, the main chip second-level key and the main chip third-level key, the reencrypted control word level by level to obtain the control word, where the main chip third-level key corresponds to the re-encryption key.

In the present embodiment, the authorization control is implemented through the main chip and the hardware security module, thereby enhancing the security of the DCAS, especially for a unidirectional DCAS without a smart card, by using the hardware security module.

Embodiment Eight

Figure 8:
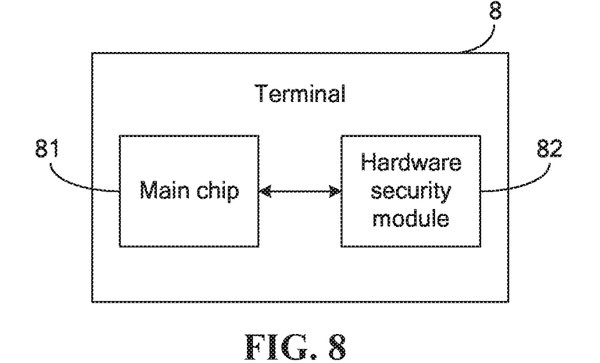
FIG. 8 is a structural diagram illustrating a terminal according to embodiment eight of the present disclosure.

FIG. 8 is a structural diagram illustrating a terminal according to embodiment eight of the present disclosure. The terminal is applied to a DCAS. The DCAS includes a front end and the terminal. As shown in FIG. 8, the terminal 8 includes a main chip 81 and a hardware security module 82 described in the above embodiments. The main chip 81 and the hardware security module 82 perform data transceiving through a security authentication channel to ensure the security of important information.

Embodiment Nine

Figure 9:
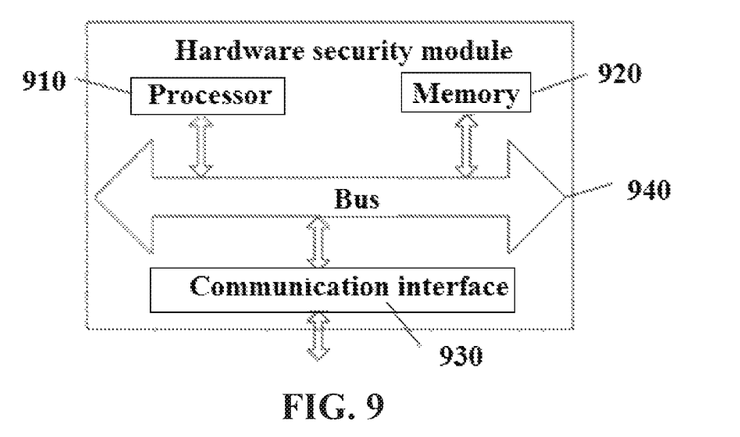
FIG. 9 is a structural diagram illustrating a hardware security module according to embodiment nine of the present disclosure.

FIG. 9 is a structural diagram illustrating a hardware security module according to embodiment nine of the present disclosure. The hardware security module includes a processor 910 and a memory 920, a communication interface 930 and a bus 940.

The processor 910, the memory 920 and the communication interface 930 may communicate with each other via the bus 940. The communication interface 930 may be used for information transmission. The processor 910 may call logic instructions in the memory 920 to execute any method in the above embodiments.

The memory 920 may include a program storage area and a data storage area. The program storage area may store an operating system and an application program required by at least one function while the data storage area may store data created depending on use of electronic devices. In addition, the memory may include a volatile memory, such as a random access memory (RAM), and may also include a nonvolatile memory, such as flash memory or another nonvolatile solid-state memory.

An embodiment of the present disclosure further provides a computer-readable storage medium configured to store computer-executable instructions for executing any method described above.

The hardware security module, the main chip and the terminal provided by the embodiments of the present disclosure are capable of performing the method for protecting the encrypted control word according to any embodiment of the present disclosure and have functional modules and beneficial effects corresponding to the method.

INDUSTRIAL APPLICABILITY

The method for protecting the encrypted control word of the present disclosure can ensure the security of the DCAS so that a terminal can safely decrypt the control word and descramble audio and video streams.

What is claimed is:

1. A method for protecting an encrypted control word, comprising:

receiving an activation message transmitted from a main chip, wherein the activation message comprises at least one of: a pairing key, a re-encryption key and a hardware security device root key;

storing the re-encryption key and the hardware security device root key, and establishing a security authentication channel between a hardware security device and the main chip based on the pairing key;

receiving a hardware security device entitlement management message and the encrypted control word transmitted from the main chip through the security authentication channel, wherein the hardware security device entitlement management message comprises a key for decrypting the encrypted control word;

decrypting, based on the hardware security device entitlement management message and the hardware security device root key stored in the hardware security device, the encrypted control word to obtain a control word;

reencrypting, based on the re-encryption key stored in the hardware security device, the control word to obtain a reencrypted control word; and transmitting the reencrypted control word to the main chip through the security authentication channel, so that the main chip decrypts, based on a main chip entitlement management message transmitted from a front end, the reencrypted control word to obtain the control word, wherein the main chip entitlement management message comprises a key for decrypting the reencrypted control word.

2. The method of claim 1, wherein the hardware security device entitlement management message comprises a hardware security device second-level key and a hardware security device third-level key;

wherein decrypting, based on the hardware security device entitlement management message and the hardware security device root key stored in the hardware security device, the encrypted control word to obtain a control word comprises:

decrypting, based on the hardware security device root key stored in the hardware security device, the hardware security device second-level key and the hardware security device third-level key, the encrypted control word level by level to obtain the control word.

3. The method of claim 1, further comprising:

receiving a key refreshing instruction transmitted from the main chip, updating and storing the hardware security device entitlement management message, the hardware security device root key and the re-encryption key.

4. A method for protecting an encrypted control word, comprising:
- generating an activation request message and transmitting the activation request message to a front end, wherein the activation request message comprises at least of: an identifier of a main chip, a conditional access certificate and a chip certificate for a hardware security device;
- receiving an activation message transmitted from the front end, and transmitting the activation message to the hardware security device, wherein the activation message comprises at least one of: a pairing key, a re-encryption key and a hardware security device root key, and the pairing key, the re-encryption key and the hardware security device root key in the activation message are distributed by the front end based on the activation request message;
- establishing a security authentication channel between the main chip and the hardware security device based on the pairing key;
- receiving the encrypted control word, a scrambled content, a main chip entitlement management message and a hardware security device entitlement management message transmitted from the front end;
- transmitting the hardware security device entitlement management message and the encrypted control word to the hardware security device through the security authentication channel, so that the hardware security device decrypts, based on the hardware security device entitlement management message and the hardware security device root key stored in the hardware security device, the encrypted control word to obtain a control word, and reencrypts the control word based on the re-encryption key stored in the hardware security device to obtain a reencrypted control word; and
- receiving the reencrypted control word transmitted from the hardware security device through the security authentication channel, decrypting, based on a main chip root key derived from the main chip and the main chip entitlement management message, the reencrypted control word to obtain the control word so that the scrambled content is descrambled based on the control word.

5. The method of claim 4, wherein before the reencrypted control word is decrypted, the method further comprises: deriving, based on a main chip security key and a derivation identifier, the main chip root key by using a derivation algorithm built-in the main chip.

6. The method of claim 4, wherein the main chip entitlement management message comprises a main chip second-level key and a main chip third-level key;
wherein decrypting, based on a main chip root key derived from the main chip and the main chip entitlement management message, the reencrypted control word to obtain the control word comprises:
decrypting, based on the main chip root key, the main chip second-level key and the main chip third-level key, the reencrypted control word level by level to obtain the control word, wherein the main chip third-level key corresponds to the re-encryption key.

7. A hardware security device, applied to a downloadable conditional access system, comprising a processor and a storage device for storing computer executable instructions that when executed by the processor cause the processor to:
- receive an activation message transmitted from a main chip, wherein the activation message comprises at least of: a pairing key, the re-encryption key and the hardware security device root key;
- store the re-encryption key and the hardware security device root key into the storage device, and establish a security authentication channel between the hardware security device and the main chip based on the pairing key;
- receive a hardware security device entitlement management message and the encrypted control word transmitted from the main chip through the security authentication channel, wherein the hardware security device entitlement management message comprises a key for decrypting the encrypted control word;
- decrypt, based on the hardware security device entitlement management message and the hardware security device root key, the encrypted control word to obtain a control word;
- reencrypt the control word based on the re-encryption key to obtain a reencrypted control word;
- transmit the reencrypted control word to the main chip through the security authentication channel, so that the main chip decrypts, based on a main chip entitlement management message transmitted from the front end, the reencrypted control word to obtain the control word, wherein the main chip entitlement management message comprises a key for decrypting the reencrypted control word.

8. The hardware security device of claim 7, wherein the hardware security device entitlement management message comprises a hardware security device second-level key and a hardware security device third-level key;
wherein the processor is further configured to:
decrypt, based on the hardware security device root key stored in the hardware security device, the hardware security device second-level key and the hardware security device third-level key, the encrypted control word level by level to obtain the control word.

9. The hardware security device of claim 7, wherein the processor is further caused to:
- receive a key refreshing instruction transmitted from the main chip, and update the hardware security device entitlement management message, the hardware security device root key and the re-encryption key;
- wherein the storage device is further configured to store the updated hardware security device entitlement management message, the updated hardware security device root key and the updated re-encryption key.

10. A main chip, applied to a downloadable conditional access system, comprising a processor and a storage device for storing computer executable instructions that when executed by the processor cause the processor to:
- generate an activation request message and transmit the activation request message to a front end, wherein the activation request message comprises at least one of: an identifier of the main chip, a conditional access certificate and a chip certificate for a hardware security device;
- receive an activation message transmitted from the front end, and transmit the activation message to the hardware security device, wherein the activation message comprises at least one of: a pairing key, the re-encryption key and the hardware security device root key, and the pairing key, the re-encryption key and the hardware security device root key in the activation message are distributed by the front end based on the activation request message;
- establish a security authentication channel between the main chip and the hardware security device based on the pairing key;

receive an encrypted control word, a scrambled content, a main chip entitlement management message and a hardware security device entitlement management message transmitted from the front end;

transmit the hardware security device entitlement management message and the encrypted control word to the hardware security device through the security authentication channel, so that the hardware security device decrypts, based on the hardware security device entitlement management message and a hardware security device root key stored in the hardware security device, the encrypted control word to obtain a control word, and reencrypts the control word based on the re-encryption key stored in the hardware security device to obtain a reencrypted control word; and receive the reencrypted control word transmitted from the hardware security device through the security authentication channel; and decrypt, based on a main chip root key derived from the main chip and the main chip entitlement management message, the reencrypted control word to obtain the control word so that the scrambled content is descrambled based on the control word.

11. The main chip of claim 10, wherein the processor is further caused to:

derive, based on a main chip security key and a derivation identifier, the main chip root key by using a derivation algorithm built-in the main chip.

12. The main chip of claim 10, wherein the main chip entitlement management message comprises a main chip second-level key and a main chip third-level key;

wherein the processor is further caused to decrypt, based on the main chip root key, the main chip second-level key and the main chip third-level key, the reencrypted control word level by level to obtain the control word, wherein the main chip third-level key corresponds to the re-encryption key.

13. A terminal, applied to a downloadable conditional access system, comprising the hardware security device of claim 7 and the main chip of claim 10.

14. A non-transitory computer-readable storage medium storing computer-executable instructions for executing the method of claim 1.

15. A non-transitory computer-readable storage medium storing computer-executable instructions for executing the method of claim 4.

* * * * *